(12) United States Patent
Bavishi et al.

(10) Patent No.: US 11,809,710 B2
(45) Date of Patent: Nov. 7, 2023

(54) OUTSTANDING TRANSACTION MONITORING FOR MEMORY SUB-SYSTEMS

(71) Applicant: Micron Technology, Inc., Boise, ID (US)

(72) Inventors: Dhawal Bavishi, San Jose, CA (US); Robert M. Walker, Raleigh, NC (US); Laurent Isenegger, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 1 day.

(21) Appl. No.: 17/485,060

(22) Filed: Sep. 24, 2021

(65) Prior Publication Data

US 2023/0098454 A1    Mar. 30, 2023

(51) Int. Cl.
*G06F 3/06* (2006.01)

(52) U.S. Cl.
CPC .......... *G06F 3/0611* (2013.01); *G06F 3/0653* (2013.01); *G06F 3/0659* (2013.01); *G06F 3/0679* (2013.01)

(58) Field of Classification Search
CPC .... G06F 3/0611; G06F 3/0653; G06F 3/0659; G06F 3/0679
See application file for complete search history.

(56) References Cited

U.S. PATENT DOCUMENTS

| 8,055,922 | B2 | 11/2011 | Brittain et al. |
| 8,271,692 | B1 | 9/2012 | Dinh et al. |
| 10,025,522 | B2 | 7/2018 | Helmick |
| 2022/0342703 | A1* | 10/2022 | Hong .................... G06F 3/0659 |

* cited by examiner

*Primary Examiner* — David Yi
*Assistant Examiner* — Dustin B. Fulford
(74) *Attorney, Agent, or Firm* — Brooks, Cameron & Huebsch, PLLC

(57) ABSTRACT

A system includes a first controller configured to adjust a count of a number of first transactions and adjust a count of a number of second transactions. The count of the number of first transactions and the count of the number of second transactions are adjusted when a first transaction or second transaction is either received or executed by a second controller. The second controller is coupled to the first controller and is configured to limit the number of first transactions to a particular quantity of outstanding first transactions, limit the number of second transactions to a particular quantity of outstanding second transactions, and limit a number of total transactions to a particular quantity of outstanding total transactions.

19 Claims, 4 Drawing Sheets

OUTSTANDING TRANSACTION MONITORING FOR MEMORY SUB-SYSTEMS

TECHNICAL FIELD

Embodiments of the disclosure relate generally to memory sub-systems, and more specifically, relate to outstanding transaction monitoring for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
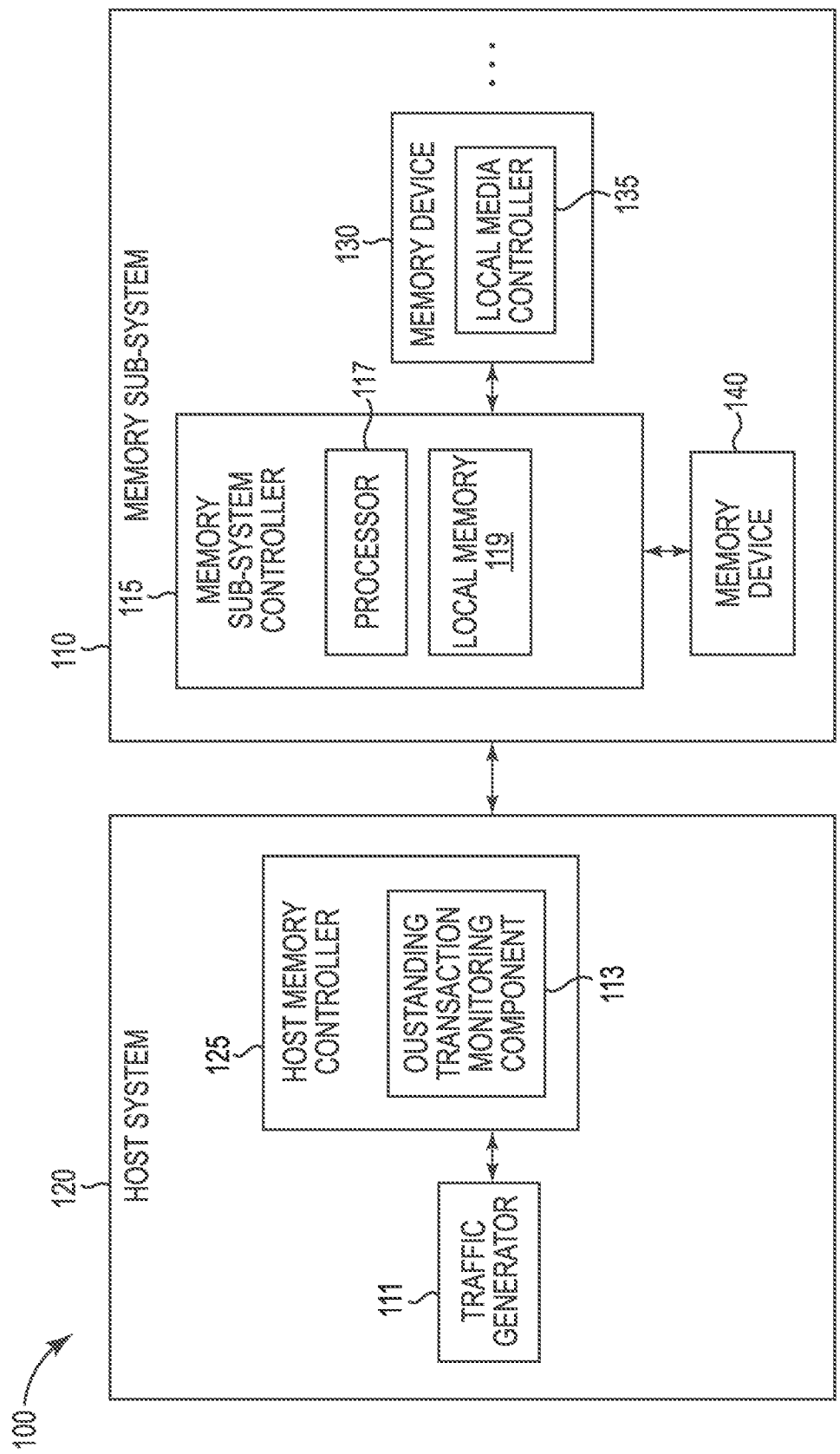
FIG. 1 illustrates an example computing system that includes a memory sub-system in accordance with some embodiments of the present disclosure.

Aspects of the present disclosure are directed to outstanding transaction monitoring for a memory sub-system, in particular to memory sub-systems that include an outstanding transaction monitoring component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

Interfaces such as peripheral component interconnect express (PCIe), compute express link (CXL), cache coherent interconnect for accelerators (CCIX), etc. allow connecting a variety of memory devices to a host system. The combination of interfaces and memory technology improvements can allow for deploying "far memory", which can consist of system memory (e.g., memory devices) being implemented behind a front-end of a memory sub-system such as PCIe, CXL, CCIX, GenZ., etc. As used herein, the front-end of the memory sub-system can be an interface to a host system and can include a controller of the memory sub-system (e.g., a front-end controller). As used herein, the front-end of the memory sub-system can comprise hardware and/or firmware configured to receive data (e.g., requests and/or data) and provide the data to a back-end of the memory sub-system. The back-end of the memory sub-system can comprise hardware and/or firmware to receive the data (e.g., requests and/or data) from the front-end of the memory sub-system and can include perform the requests provided from the host on the memory devices of the memory sub-system.

A host system can provide requests (e.g., commands) to a memory sub-system and those requests can be stored in command queues of the memory sub-system. The requests can become backlogged within the memory sub-system such that a latency of the execution of the requests from the time the requests are received from the host system may increase as the quantity of requests stored in the command queues of the memory sub-system front-end and/or back-end increases. For example, as the memory sub-system queues are freed due to providing the requests to a controller of a memory sub-system, the command queues of the memory sub-system may begin to become saturated such that the latency of the execution of operations corresponding to the requests can increase. Increasing the execution latency of the commands can affect the efficiency of the system. That is, the system may wait for the execution of the commands provided to the memory sub-system such that the system is inefficient. Further, if the command queues of the memory sub-system become saturated, the host may stop accepting transactions from a traffic generator. A traffic generator is a component (e.g., processor) on the host system that provides transactions to a host controller (e.g., a controller of a CXL initiator) of the host system. Transactions can be queued on the initiator and the initiator won't request or accept further transactions from the traffic generator if the read transaction count, write transaction count, or total transaction count thresholds are met or exceeded.

Aspects of the present disclosure address the above and other deficiencies by implementing a control mechanism in a host system to monitor quantities of outstanding transactions (e.g., commands) provided from the host system to a memory sub-system (e.g., solid state drive, memory module, etc.). As used herein, the term "outstanding transaction" refers to a transaction issued from the host to a memory sub-system (e.g., a target) for which the host has not yet received an acknowledgement (back from the target) of transaction completion. In various embodiments, upon receiving the acknowledgement of transaction completion, an outstanding transaction monitoring component of the host system can decrement one or more counter(s) that maintain a count of particular outstanding transactions. For example, the outstanding transaction monitoring component can set a particular quantity of outstanding read commands, a particular quantity of outstanding write commands, and/or a particular quantity of outstanding total commands. The particular quantity of read commands can indicate a maximum number of outstanding read commands, the particular quantity of write commands can indicate a maximum number of outstanding write commands, and the particular quantity of total commands can indicate a maximum number of total outstanding commands. For example, when the particular quantity of total commands is reached, the outstanding transaction monitoring component can prevent further commands from being issued to the memory sub-system (e.g., to a front-end portion of the memory sub-system). The outstanding transaction monitoring component can prevent further commands from being issued by preventing further requests/commands from being received by a transaction generator (e.g., a host processor), for example. Further, the initiator can signal to the traffic generator that it can once again send transactions to the initiator. By the host deciding not to send commands once a respective particular quantity has been reached, the system can avoid the increased lag time caused by the number of outstanding commands reaching a number that adversely affects the quality-of-service metrics of the end-to-end system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a traffic generator 111 and a host memory controller 125. The traffic generator 111 can include a processor chipset (e.g., CPU chipset) and a software stack executed by the processor chipset. The processor chipset can include one or more cores and/or one or more caches. The traffic generator 111 can further include a buffer (not illustrated in FIG. 1) that initially stores host commands received at the host system 120 prior to being sent to the host memory controller 125.

The host memory controller 125 can operate as a storage protocol controller (e.g., PCIe controller, SATA controller, CXL controller). The host memory controller 125 can include an outstanding transaction monitoring component 113.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffers (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host memory controller 125 can include an outstanding transaction monitoring component 113. Although not shown in FIG. 1 so as to not obfuscate the drawings, the outstanding transaction monitoring component 113 can include various circuitry to facilitate monitoring read commands and write commands for a memory sub-system and/or components of the memory sub-system, determining whether to perform outstanding transaction monitoring operations for the memory sub-system and/or components of the memory sub-system based on latency parameters of the memory sub-system and/or components of the memory sub-system, and/or controlling performance of outstanding transaction monitoring operations for the memory sub-system and/or the components of the memory sub-system. In some embodiments, the outstanding transaction monitoring component 113 can include circuitry in the form of an ASIC, FPGA, state machine, and/or other logic circuitry that can allow the outstanding transaction monitoring component 113 to orchestrate and/or perform operations corresponding to outstanding transaction monitoring for the host memory controller 125.

In some embodiments, a number of credits can be adjusted and returned based on the number of outstanding transactions stored in the queues of the memory sub-system 110. The queues can be in a front-end portion, central portion, and/or a back-end portion of the memory sub-system 110. Transactions can be sent from the traffic generator 111 to the host memory controller 125 when the number of outstanding transactions in the memory sub-system 110 does not meet or exceed a particular quantity of that type of transaction. For example, read commands can be sent from the traffic generator 111 to the host memory controller 125 when the number of outstanding read commands to does meet or exceed a particular quantity of outstanding read commands. If the number of outstanding transactions does meet or exceed the particular quantity of that type of transaction, the host memory controller 125 will indicate to the traffic generator 111 that the host memory controller 125 will not accept any subsequent transactions. Once the number of outstanding transactions is below the particular quantity of that type of transaction, the host memory controller 125 can indicate to the traffic generator 111 that the host memory controller 125 can now accept more transactions of that type.

When the queues have not reached the particular quantity of total transactions, the front-end (e.g., front-end interface) can operate as usual, accepting transactions with the available space in the queues of the front-end portion, central portion, and back-end portion of the memory sub-system controller 115. The outstanding transaction monitoring component 113 can include a counter that tracks the number of outstanding transactions in the memory sub-system 110. Once this counter reaches a particular quantity of total outstanding transactions, the front-end can refrain from accepting transactions from the host 120.

In some embodiments, incoming transactions can be limited once the outstanding transaction monitoring component 113 detects that the queues are reaching the particular quantity of total transactions. The outstanding transaction monitoring component 113 can utilize existing infrastructure and messages to limit incoming traffic. Limiting incoming traffic based on the status of the transaction queues can provide for better average read latency and better utilization of resources in the memory sub-system 110. In some embodiments, queues (e.g., queues 223-1, 223-2, 223-3 (collectively known as queues 223) in FIG. 2) can include read command queues and write command queues. In various embodiments, the queues can be part of the front-end controller (e.g., front-end controller 216 in FIG. 2) and/or the CXL sub-system controller (e.g., CXL sub-system controller 228 in FIG. 2).

Figure 2:
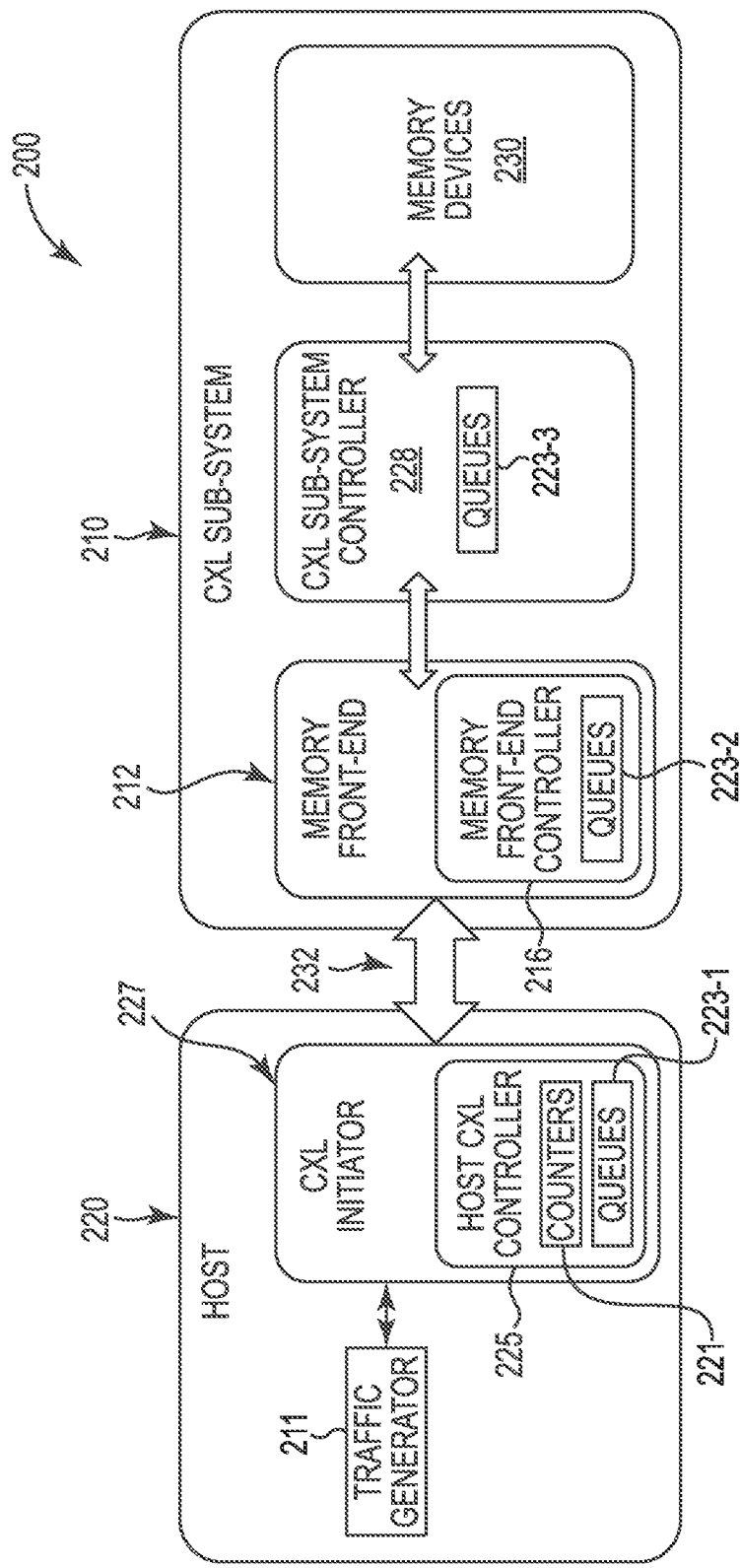
FIG. 2 illustrates an example computing system that includes a memory sub-system in accordance with some embodiments of the present disclosure.

FIG. 2 illustrates an example computing system 200 that includes a memory sub-system 210 in accordance with some embodiments of the present disclosure. The computing system 200 includes the host 220 and the memory sub-system 210. The host 220 can include a traffic generator 211 and interface circuitry 227 while the memory sub-system 210 includes front-end circuitry 212 and a controller 228, which can be part of an overall memory sub-system controller, such as controller 115 described in FIG. 1. In some embodiments, the interface circuitry 227 can also be referred to as a compute express link (CXL) initiator 227. In some embodiments, the CXL initiator 227 comprises a host CXL controller 225 that comprises counters 221 and queues 223-1. Further, in some embodiments, the memory sub-system 210 can be a CXL sub-system 210. The CXL sub-system 210 can include the front-end circuitry 212 and a controller 228 coupled to memory devices 230. In some embodiments, the controller 228 can be a CXL sub-system controller 228. The CXL sub-system controller 228 can include queues 223-3 and can comprise a central portion and a back-end portion of the CXL memory sub-system 210. The back-end portion can include a memory channel controller and a plurality of memory channels (not pictured) to couple the CXL sub-system controller 228 to the memory devices 230. Although the memory devices are labeled 230 the memory devices 230 can include volatile and non-volatile memory devices (e.g., memory devices 130, 140 in FIG. 1). The host 220 can be coupled to the memory sub-system 210 via a physical interface 232, including hardware components, to transfer data between the host 220 and the memory sub-system 210. In some embodiments, the physical interface 232 can be a CXL link 232. In some embodiments, the communications between the host 220 and the memory sub-system 210 can be CXL compliant.

The front-end 212 can receive commands from the host 220. The interface 227 can receive commands from the memory sub-system 210. The front-end 212 can include controller 216 (e.g., memory front-end controller 216) and queues 223-2. The interface 227 can also include a controller 225 (e.g., host CXL controller 225).

The controllers 216, 225 can also be described as processing devices (e.g., processors). The controllers 216, 225 can include hardware such as one or more integrated circuits and/or discrete components, a buffer memory, or a combination thereof. The hardware can include digital circuitry with dedicated (i.e., hard-coded) logic to perform the operations described herein. The controllers 216, 225 can be microcontrollers, special purpose logic circuitry (e.g., a field programmable gate arrays (FPGA), an application specific integrated circuits (ASIC), etc.), or other suitable processors.

In some embodiments, the memory subsystem 210 can include a controller 228 coupled to memory devices 230 via a plurality of channels. Further, the memory subsystem 210 can include a controller portion 216 and a controller portion 228. The controller portion 216 can be referred to as a "front-end" controller, and the controller portion 228 can include a central controller portion and one or more memory controllers that interface directly with the memory devices 230 via the plurality of channels, and which may be referred to as "back-end" memory controllers.

The CXL initiator 227 can be coupled to the memory subsystem 210 via a CXL interface 232 and can be configured to send a first transaction (e.g., read command) to a first transaction queue (e.g., read command queue) 223 and send a second transaction (e.g., write command) to a second transaction queue (write command queue) 223. Further, the host CXL controller 225 can be configured to adjust a count of a number of first transactions when the first transaction is added to the first transaction queue 223 and adjust a count of a number of second transactions when the second transaction is added to the second transaction queue 223. For example, a count of the read commands can be increased when a read command is added to a read command queue 223 and a count of the write commands can be increased when a write command is added to the write command queue 223.

Further, in some embodiments, the host CXL controller 225 can adjust the count of the number of first transactions when the first transaction is removed from the first transaction queue 223 and adjust the count of the number of second transactions when the second transaction is removed from the second transaction queue 223. For example, the host CXL controller 225 can decrease the count of the number of read commands when a read command is removed from a read command queue 223 and decrease the count of the number of write commands when a write command is removed from a write command queue 223.

In some embodiments, the memory subsystem 210 can comprise a front-end controller 216 configured receive the first transaction and the second transaction, place the first transaction in the first transaction queue 223 and place the second transaction in the second transaction queue 223, and remove the first transaction from the first transaction queue 223 and remove the second transaction from the transaction queue 223. For example, the front-end controller 216 can receive read commands and write commands from the host CXL controller 225. Further, the front-end controller 216 can place the read commands into read command queues 223 and write commands in write command queues 223 when the read commands and write commands are received from the host CXL controller 225. Further, the front-end controller 216 can remove read commands from the read command queues 223 and remove write commands from the write command queues 223 when the read commands and write commands are sent to the CXL sub-system controller 228 for execution.

The front-end 212 can receive data from the host 220. In some embodiments, the data can include read commands and write commands. The controller 216 can store the commands in, for example, queues 223-2 (e.g., read command queues and write command queues). The controller 228 can access the commands stored in the front-end 212 (e.g., queues 223-2 of the front-end). The controller 228 can receive the commands such that the front-end 212 can push the commands to the controller 228 or the controller 228 can pull the commands. The commands are removed from the queues 223-2 when the commands are received by the controller 228.

In some embodiments, the front-end controller 216 can close the first transaction queue 223 to subsequent first transactions when the number of first transactions in the first transaction queue 223 reaches a particular number of outstanding first transactions or when a number of total transactions in the first transaction queue 223 and the second transaction queue 223 reaches a particular quantity of total transactions. For example, a read command queue 223 can be closed to subsequent read commands when the number of read commands in the read command queue 223 reaches a particular number of read commands or when a number of total read commands in the read command queue 223 and write commands in the write command queue 223 reaches a quantity of total commands. Further, in some embodiments, the front-end controller 216 can close the second transaction queue 223 to subsequent second transactions when the number of second transactions in the second transaction queue 223 reaches a particular quantity of second transactions or when the number of total transactions in the first transaction queue 223 and the second transaction queue 223 reaches the particular quantity of total transactions. For example, a write command queue 223 can be closed to subsequent write commands when the number of write commands in the write command queue 223 reaches a particular number of write commands or when a number of total read commands in the read command queue 223 and write commands in the write command queue 223 reaches a quantity of total transactions In some embodiments, the particular quantity of first transactions, second transactions, and total transactions can be based on a bottleneck of a bandwidth of the CXL interface 232 and/or a size of the first transaction queue 223 and a size of the second transaction queue 223. As used herein, the term "bandwidth" refers to a maximum rate of data transfer across a given path. As used herein, the term "bottleneck" refers to a component that limits the transfer of data and has the lowest throughput of the components in the path of data transfer. The rate of data transfer from the CXL initiator 227 to the memory front-end 212 through the CXL interface 232 can affect the values of the particular quantities of first commands, second commands, and total commands. Larger queues can hold more data, which is beneficial when data is being transferred at faster speeds. Larger queues can allow for more data to be placed in the queues before closing the queues to subsequent commands. This allows queues to be open for longer when data is being transferred at faster speeds. Further, the particular quantity of first transactions, second transactions, and total transactions can be based on the size of the first transaction queue 223 and the second transaction queue 223 because the particular quantity of first transactions, second transactions, and total transactions must correspond to the number of transactions each queue 223 is capable of holding.

In some embodiments, information corresponding to the particular quantities of first transactions, second transactions, and total transactions is sent over the CXL interface 232. Further, in some embodiments, data related to the state of other components, such as the state of a cache memory, can be transferred over the CXL interface 232. While other types of interfaces may be able to transfer the data such as the particular quantities of transactions and the state of a cache memory in a central processing unit (CPU) core, other types of interfaces may not transfer these types of data outside of the CPU core. The CXL interface can transfer these types of data outside of the CPU core.

In some embodiments, the first transaction queue 223 is opened to receive subsequent first transactions after a first transaction is removed from the first transaction queue 223 after the particular quantity of first transactions is reached. For example, after a read command queue 223 is closed to subsequent read commands due to the number of read commands in the read command queue 223 reaching the particular quantity of read commands, the read command queue 223 can be opened to subsequent read commands if a read command is removed from the read command queue 223 such that the number of read commands in the read command queue 223 is less than the particular quantity of read commands. In some embodiments, the second transaction queue 223 is opened to receive subsequent second transactions after a second transaction is removed from the second transaction queue 223 after the particular quantity of second transactions is reached. For example, after a write command queue 223 is closed to subsequent write commands due to the number of write commands in the write command queue 223 reaching the particular quantity of write commands, the write command queue 223 can be opened to subsequent write commands if a write command is removed from the write command queue 223 such that the number of write commands in the write command queue 223 is less than the particular quantity of write commands.

In some embodiments, the front-end controller 216 can indicate whether the host 220 can provide additional requests based on whether the controller 225 has previously indicated that it is available to receive additional communications. For instance, the controller 225 can indicate to the memory sub-system 210 that it is not ready to receive additional data responsive to which the controller 216 can refrain from providing an update on the credits available to the host 220, where the credits indicate whether the host 220 can send additional requests.

The controller 225 can also include queues 223-1 that hold data provided by the memory sub-system 210 and/or the traffic generator 211. The controller 225 can track the space in the queues 223-1 of the CXL initiator 227 available to hold additional transactions received from the memory sub-system 210 and/or the traffic generator 211. The controller 225 can indicate availability to receive additional transactions to the memory sub-system 210 and/or the traffic generator 211 based on availability of the queues of the CXL initiator 227 to store additional data.

In some embodiments, the first transactions and the second transactions can be processed asymmetrically. In other words, read commands in the CXL memory subsystem 210 can be processed differently than write commands in the CXL memory subsystem 210. For example, when a read command request is sent from the host 220 to the memory sub-system 210, a response can be sent to the host 220 when data corresponding to the read command request returns to the host 220. However, when a write command request is sent from the host 220 to the CXL memory sub-system 210 through the CXL interface 232, there are multiple options for the timings for which the response can be sent to the host 220. One option is that an acknowledgement can be sent back to the host 220 after the write command is completed. Another option is that an acknowledgement can be set to the host 220 before the write command has been completed.

Figure 3:
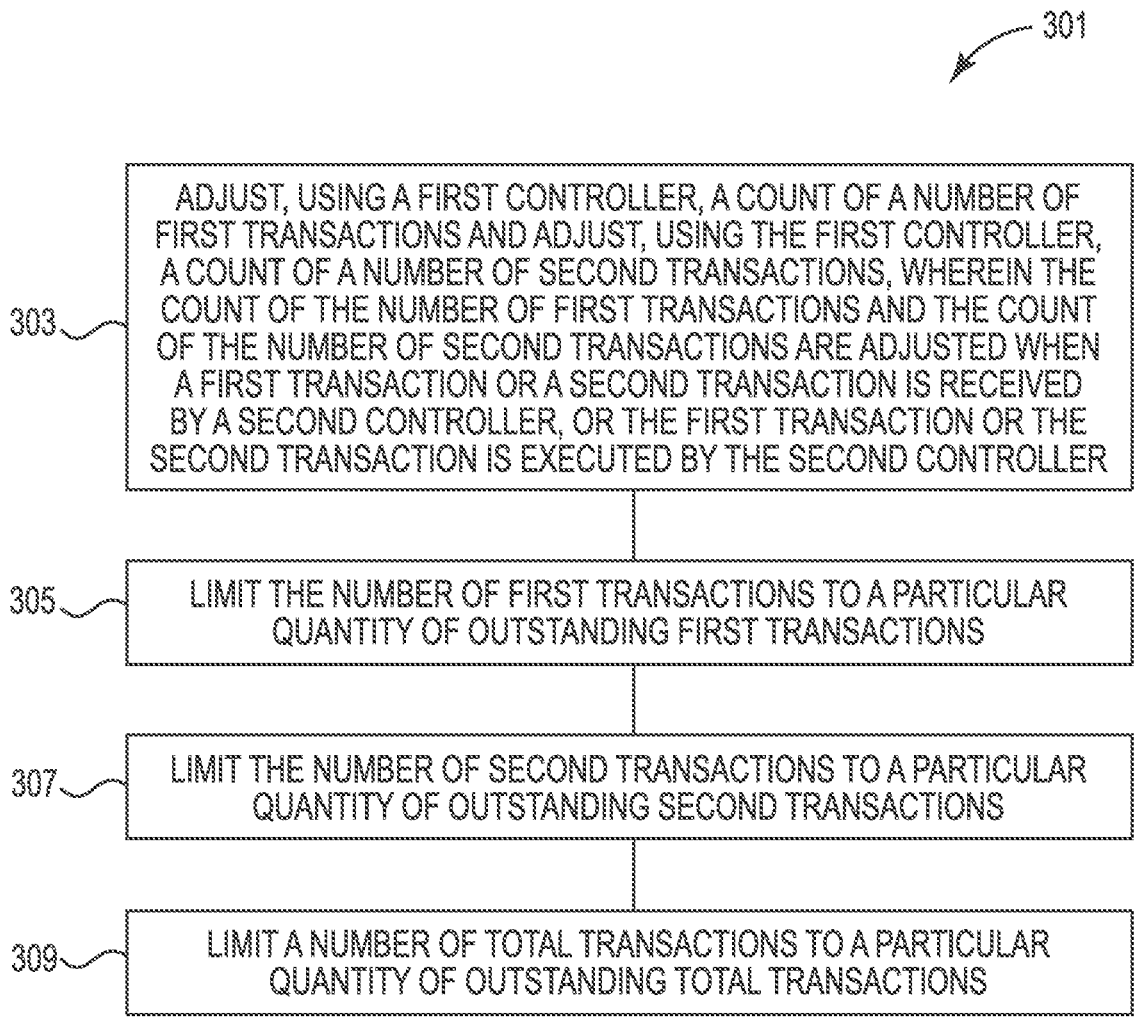
FIG. 3 is a flow diagram corresponding to outstanding transaction monitoring for a memory sub-system in accordance with some embodiments of the present disclosure.

FIG. 3 is a flow diagram 301 corresponding to outstanding transaction monitoring for a memory sub-system in accordance with some embodiments of the present disclosure. At operation 303, a count of a number of first transactions (e.g., read commands) and a count of a number of second transactions (e.g., write commands) can be adjusted using a first controller (e.g., host system controller). Further, at operation 303, the count of the number of first transactions and the count of the number of second transactions are adjusted when a first transaction or a second transaction is received by a second controller (e.g., memory front-end controller), or the first transaction or second transaction is executed by the second controller.

At operation 305, the number of read commands (e.g., first transactions) can be limited to a particular quantity of outstanding first transactions. In some embodiments, subsequent read commands can be sent to the read command queue (e.g., first transaction queue) when the number of total transactions in the read command queue and the write command queue is below a particular quantity of outstanding total transactions A read command queue can stop accepting subsequent read commands once the particular quantity of outstanding read commands is reached and a read command queue can resume accepting subsequent commands after a read command is removed from a read command queue.

At operation 307, the number of write commands (e.g., second transactions) can be limited to a particular quantity of outstanding second transactions. In some embodiments, subsequent write commands can be sent to the write command queue (e.g., second transaction queue) when the number of total transactions in the read command queue and the write command queue is below a particular quantity of outstanding total transactions. A write command queue can stop accepting subsequent write commands once the particular quantity of outstanding write commands is reached and a write command queue can resume accepting subsequent write commands after a write command is removed from a write command queue.

At operation 309, the number of total transactions can be limited to a particular quantity of outstanding total transactions. The number of total transactions can be determined by the sum of the read commands in the read command queues and the write commands in the write command queues. In some embodiments, the particular quantity of total transactions can be a quantity of total transactions that will cause the read command queue and the write command queue to stop accepting subsequent commands when the sum of the read commands in the read command queue and the write commands in the write command queue meet or exceed to the particular quantity of total transactions.

Figure 4:
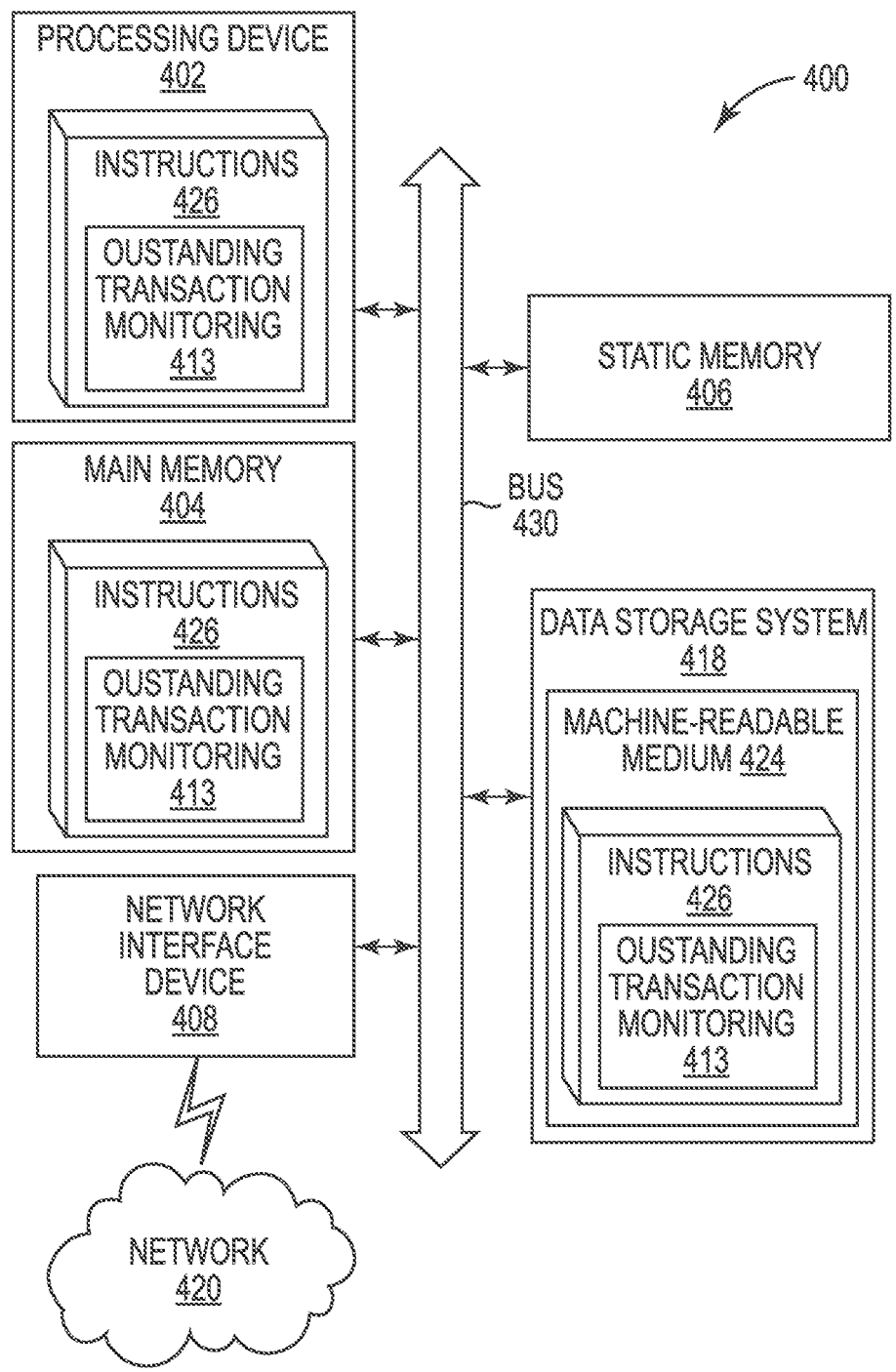
FIG. 4 is a block diagram of an example computer system in which embodiments of the present disclosure may operate.

If a read command queue has a number of commands that is equal to a particular quantity of read commands, the host system can send an indication to the front-end memory controller that the particular quantity of read commands has been reached and no further read commands can be sent to the read command queue. Once a read command has been removed from the read command queue, an indication can be sent to front-end memory controller that a new read command can be sent to the read command queue. Further, if a read command queue or write command queue has a number of read commands or write commands, respectively, that is less than the particular number of read commands or write commands, respectively, but the read command queue and the write command queue have a total number of commands that is equal to the particular number of total commands, the host system controller can indicate to the memory front-end controller that no commands can be sent to either the read command queue or the write command queue. Once a command is removed from either the read command queue or the write command queue, an indication can be sent to the front-end memory controller that a command can be sent to whichever of the read command queue or write command queue that does not have a number of commands that is equal to its respective particular quantity of commands FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to outstanding transaction monitoring 413). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to outstanding transaction monitoring 413. While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense

What is claimed is:

1. An apparatus, comprising:
a first controller configured to:
adjust a count of a number of first transactions and adjust a count of a number of second transactions, wherein the count of the number of first transactions and the count of the number of second transactions are adjusted when:
a first transaction or a second transaction is received by a second controller; or
the first transaction or the second transaction is executed by the second controller; and
send a signal to a traffic generator to limit a number of first transactions sent by the traffic generator to the first controller and limit a number of second transactions sent by the traffic generator to the first controller in response to the first controller detecting a first transaction queue and a second transaction queue are reaching a particular quantity of total transactions; and
wherein the second controller is coupled to the first controller and configured to:
limit the number of first transactions to a particular quantity of outstanding first transactions;
limit the number of second transactions to a particular quantity of outstanding second transactions; and
limit a number of total transactions to a particular quantity of outstanding total transactions.

2. The apparatus of claim 1, wherein the first transaction is a read command and the second transaction is a write command.

3. The apparatus of claim 1, wherein the particular quantity of outstanding first transactions and the particular quantity of outstanding second transactions are determined based on a type of memory device coupled to the second controller.

4. The apparatus of claim 1, wherein the first controller includes the first transaction queues to hold the first transactions and the second transaction queues to hold the second transactions.

5. The apparatus of claim 4, wherein the first controller is further configured to maintain a count of a number of outstanding first transactions in the first transaction queue and maintain a count of a number of outstanding second transactions in the second transaction queue.

6. The apparatus of claim 5, wherein the first controller is further configured to adjust a count of the number of outstanding first transactions in the first transaction queue after the first transaction leaves the first transaction queue and before the first transaction is executed.

7. The apparatus of claim 5, wherein the first controller is further configured to adjust a count of the number of outstanding second transactions in the second transaction queue after the second transaction leaves the second transaction queue and before the second transaction is executed.

8. The apparatus of claim 5, wherein a subsequent first transaction is added to the first transaction queue after the count of the number of first transactions is adjusted from the particular quantity of outstanding first transactions.

9. The apparatus of claim 5, wherein a subsequent second transaction is added to the second transaction queue after the count of the number of second transactions is adjusted from the particular quantity of outstanding second transactions.

10. A method, comprising:
    adjusting, using a first controller, a count of a number of first transactions and a count of a number of second transactions, wherein the count of the number of first transactions and the count of the number of second transactions are adjusted when:
        a first transaction or a second transaction is received by a second controller; or
        the first transaction or the second transaction is executed by the second controller;
    limiting the number of first transactions to a particular quantity of outstanding first transactions;
    limiting the number of second transactions to a particular quantity of outstanding second transactions;
    limiting a number of total transactions to a particular quantity of outstanding total transactions; and
    sending a signal to a traffic generator to limit the number of first transactions sent from the traffic generator to the first controller and limit the number of second transactions sent from the traffic generator to the first controller in response to the first controller detecting a first transaction queue and a second transaction queue are reaching a particular quantity of total transactions.

11. The method of claim 10, further comprising sending a subsequent first transaction to the first transaction queue when the number of total transactions in the first transaction queue and the second transaction queue is below the particular quantity of outstanding total transactions.

12. The method of claim 10, further comprising sending a subsequent second transaction to the second transaction queue when the number of total transactions in the first transaction queue and the second transaction queue is below the particular quantity of outstanding total transactions.

13. A system, comprising:
    a memory subsystem; and
    a compute express link (CXL) initiator coupled to the memory subsystem via a CXL interface and configured to:
        send a first transaction to a first transaction queue and send a second transaction to a second transaction queue;
        adjust a count of a number of first transactions when the first transaction is added to the first transaction queue and adjust a count of a number of second transactions when the second transaction is added to the second transaction queue; and
        adjust the count of the number of first transactions when the first transaction is removed from the first transaction queue and adjust the count of the number of second transactions when the second transaction is removed from the second transaction queue;
    wherein the CXL initiator includes a host CXL controller configured to send a signal to a traffic generator to limit the number of first transactions received by the host CXL controller and limit the number of second transactions received by the host CXL controller in response to the host CXL controller detecting the first transaction queue and the second transaction queue are reaching a particular quantity of total transactions;
    wherein the memory subsystem comprises a front-end controller configured to:
        receive the first transaction and the second transaction;
        place the first transaction in the first transaction queue and place the second transaction in the second transaction queue;
        remove the first transaction from the first transaction queue and remove the second transaction from the second transaction queue;
        close the first transaction queue to subsequent first transactions when the number of first transactions in the first transaction queue reaches a particular number of outstanding first transactions or when a number of total transactions in the first transaction queue and the second transaction queue reaches a particular quantity of total transactions; and
        close the second transaction queue to subsequent second transactions when the number of second transactions in the second transaction queue reaches a particular quantity of second transactions or when the number of total transactions in the first transaction queue and the second transaction queue reaches the particular quantity of total transactions.

14. The system of claim 13, wherein the particular quantity of first transactions, second transactions, and total transactions are based on:
    a bottleneck of a bandwidth of the CXL interface; or
    a size of the first transaction queue and a size of the second transaction queue; or both.

15. The system of claim 13, wherein information corresponding to the particular quantities of first transactions, second transactions, and total transactions is sent over the CXL interface.

16. The system of claim 13, wherein the first transaction queue is opened to receive subsequent first transactions after the first transaction is removed from the first transaction queue after the particular quantity of first transactions is reached.

17. The system of claim 13, wherein the second transaction queue is opened to receive subsequent second transactions after the second transaction is removed from the second transaction queue after the particular quantity of second transactions is reached.

18. The system of claim 13, wherein the first transactions and the second transactions are processed asymmetrically.

19. The system of claim 13, wherein the memory subsystem includes:
   the host CXL controller coupled to memory devices via a plurality of channels; and
   a front-end controller portion, a central controller portion, and a backend controller portion.

* * * * *